Patented Feb. 10, 1953

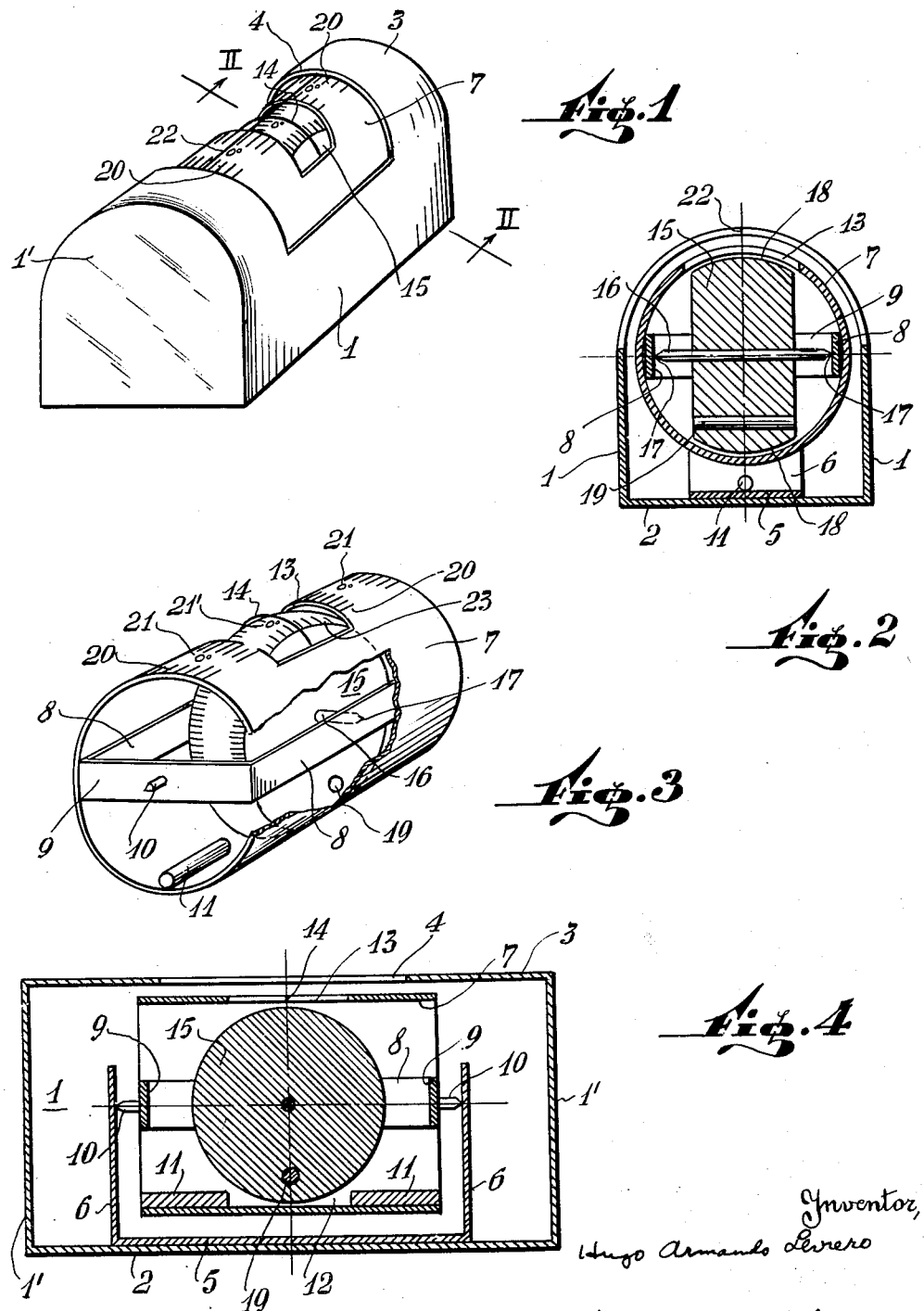
Feb. 10, 1953     H. A. LEVRERO     2,627,666
GRADIENT INDICATING LEVEL
Filed Feb. 11, 1952

2,627,666

UNITED STATES PATENT OFFICE 2,627,666

GRADIENT INDICATING LEVEL

Hugo Armando Levrero, Montevideo, Uruguay

Application February 11, 1952, Serial No. 270,977

7 Claims. (Cl. 33—215)

This invention relates to a gradient indicating level, and more particularly to a gradient indicating level for indicating simultaneously both the longitudinal and transverse inclination angles with respect to the horizontal plane.

The present invention provides a novel, more compact and simple level which will indicate at the same time the angle of inclination of the surface being examined, both in a longitudinal and a transverse direction, wherein said longitudinal and transverse angles of inclination are shown in a single window, thereby facilitating the reading of the instrument.

Broadly, the novel gradient indicating level of this invention comprises a box having a flat bottom and a semi-cylindrical top having a semi-cylindrical window therein, a hollow tubular member pivotally mounted in said box so as to be capable of rotating about the axis thereof, and having an eccentric weight and a window formed across the wall thereof opposite said weight, a drum also having an eccentric weight being pivotally mounted within the tubular member so that the axis of the drum will be displaced 90° with respect to the axis of the tubular member and so that the periphery thereof will be visible through said tubular member window, the periphery of the drum and tubular member carrying graduations in both directions from a "zero" point located directly opposite the weights thereof, which will be visible through said box window which is provided with a transparent cover bearing a hair line normally registering with the "zero" point on the periphery of the tubular member while a further hair line normally registering with the "zero" point on the periphery of the drum is provided on the transparent cover of the tubular member window. It will be seen that with this arrangement it is possible to read through a single window both the longitudinal and the transverse angles of inclination of the surface being examined.

Therefore, one of the objects of this invention is to provide a gradient indicating level which will give a simultaneous reading of both the longitudinal and transverse angles of inclination in a single window.

A further object of the invention is to provide a level of the aforesaid type which is simple in construction and which may be easily manufactured at a relatively low cost.

Other objects and advantages of the invention will become apparent in the course of the following detailed description thereof. In order that the invention may be more clearly understood and readily carried out, a preferred embodiment thereof has been illustrated by way of example in the accompanying drawings, in which:

Fig. 1 is a perspective view of the gradient indicating level in accordance with this invention;

Fig. 2 is a cross-sectional view taken substantially along the line II—II of Fig. 1.

Fig. 3 is a perspective view, partly broken away, of the tubular member with the pivoted drum member housed therein; and Fig. 4 is a longitudinal sectional view of the level according to this invention.

The same reference characters are used to indicate like or corresponding parts throughout the drawings.

With reference to the drawings, the gradient indicating level in accordance with this invention comprises a box 1 having a flat bottom 2 and a semi-cylindrical top 3 having a relatively wide semi-cylindrical window 4 which is covered by a transparent member.

Secured to the bottom 2 in said box 1 is a U-shaped support 5, the arms 6 of which are directed upwardly so as to remain substantially parallel to the end walls 1' of box 1, said arms having aligned bearings adapted to receive pivot pins, as will be later explained.

An open ended cylindrical tubular member 7 made of relatively lightweight material carries secured internally therein a four-sided frame comprising two opposite side portions 8 which are connected together by a pair of end portions 9. This frame 8—9 is secured in the bore of the cylindrical tubular member 7 by fixing the side portions 8 to diametrically opposed side walls of the tubular member 7, as clearly shown in Fig. 3, with the end portions 9 substantially flush with the open ends of the tubular member, so that a pair of aligned pivot pins 10 provided one on each of the frame end portions 9 and projecting outwardly therefrom will be concentric with the axis of rotation of said cylindrical tubular member 7. These pivot pins 10 are preferably conical, as shown, are are mounted in the aforesaid aligned bearings provided in arms 6 of support 5.

A pair of similar weights 11, preferably in the form of rods, are fixed to the inner wall of the tubular member 7, as clearly shown in Figs. 3 and 4, said weights 11 being aligned and located one towards each end of the tubular member 7 (see Fig. 4) so as to leave a gap 12 therebetween.

A window 13 is formed in the cylindrical tubular member 7 across the wall thereof opposite said weights 11, said window being preferably closed by means of a transparent member bearing a hair line 14.

Mounted transversely in the cylindrical tubular member 7, within the frame 8—9, is a drum member 15 having a shaft 16 formed preferably with conical ends 17 engaging bearings formed in the frame side portions 8 which are substantially aligned with said hair line 14 on window 13 of tubular member 7.

The drum member 15 has a rounded periphery 18 as clearly shown in Fig. 2, and an eccentric weight 19 also preferably in the shape of a rod is fixed in the body of the drum member 15, near the periphery thereof.

It will thus be seen that the longitudinal axis of the drum member 15 is displaced at 90° with respect to the longitudinal axis of the cylindrical tubular member 7, and that the diameter of the drum member 15 is such as to fit within the tubular member 7 leaving only a small clearance between the peripheral surface of the former and the inner surface of the latter. The curvature of the periphery of the drum is preferably such as to follow the curvature of the tubular member bore.

At one or both sides of the window 13, the cylindrical tubular member 7 bears a scale of values 20 such as an angle scale, in which case said scale will include a reference or "zero" point 21 located directly opposite the center of the weight 11, the scale running 180° in each direction from said "zero" point. This scale 20 will be observed through the box window 4, which is covered by a transparent member bearing a hair line 22.

A similar scale 23 is formed or applied to the periphery of drum member 15, with a "zero" point 21' located opposite the center of the weight 19, the scale 23 also running 180° in each direction from said zero point. This scale 23 will be seen through the window 13 in the cylindrical tubular member 7 and hence through the box window 4.

It will be readily understood from the above that upon placing the level described above longitudinally on an inclined surface, the drum member 15 will rotate due to the weight 19, indicating through the windows 13 and 4 the angle of the surface with respect to the horizontal plane in the longitudinal direction, while the angle of inclination relative to the horizontal plane in the transverse direction will be shown simultaneously through the window 4 by the cylindrical tubular member 7, which will rotate due to the action of gravity on the weights 11.

It is evident that in carrying out this invention, many changes, modifications and/or alterations will occur to those skilled in the art, without departing from the scope of the invention as clearly set forth in the appended claims.

I claim:

1. A gradient indicating level, which comprises a box having a flat bottom and a substantially semi-cylindrical top, having a semi-cylindrical window, an open-ended hollow cylindrical member having two diametrically opposed frame side members secured therein and connected together by a pair of frame end members each located diametrically across one of the open ends of said hollow cylindrical member and substantially flush therewith, aligned pivot pins on said frame end member concentric with the axis of rotation of said cylindrical hollow member, aligned bearing means substantially midway in said frame side members, suitably spaced upright members in said box secured to the bottom thereof and having bearings adapted to be engaged by said frame end member pivot pins whereby said hollow cylindrical member may rotate freely in said box, said hollow cylindrical member having eccentric weight means, a transverse elongated window opposite said weight means and an angle indicating scale about the periphery thereof; a drum member mounted within said hollow cylindrical member and having a rotation shaft engaging said frame side member bearings, whereby the axis of rotation of said drum member will be shifted 90° with respect to the axis of rotation of said hollow cylindrical member, said drum member having an eccentric weight, an angle scale on the periphery thereof aligned with said hollow cylindrical member window and including a reference point directly opposite the center of said weight, said hollow cylindrical and drum member windows having transparent covers provided each with a hair line normally coinciding with said reference points.

2. A gradient indicating level as claimed in claim 1, wherein said upright members are constituted by arms of a U-shape member having an arm-connecting portion of which is fixed to said box bottom.

3. A gradient indicating level as claimed in claim 1, wherein the periphery of said drum member is curved so as to follow substantially the curvature of the bore of said hollow cylindrical member.

4. A gradient indicating level as claimed in claim 1, wherein said hollow cylindrical member pivot pins and said drum member shaft ends are conical.

5. A gradient indicating level as claimed in claim 1, wherein the periphery of said hollow cylindrical member bears an angle scale adjacent each side of the window thereof.

6. A gradient indicating level as claimed in claim 1, wherein said hollow cylindrical member eccentric weight means is constituted by a pair of suitably spaced aligned rod-shaped weights.

7. A gradient indicating level comprising a box having a flat bottom, a top, a first window in said top, a first frame in said box, an open ended hollow member in said box, a second frame mounted in said hollow member, aligned pivot pins secured to said second frame end emerging out of said open ended hollow member, said pivot pins engaging said first frame and rotatably supporting said hollow member, first eccentric weight means secured to said hollow member, a second window opposite said first weight means in said hollow member, first scale angle indicating means on the periphery of said hollow member, a drum member having a rotation shaft, said drum member rotatably mounted in said hollow member and supported by said second frame, the axis of said rotation shaft being perpendicular to the axis of said hollow member, a second eccentric weight supported by said drum member, a second scale angle indicating means on the periphery of said drum member, said first and second windows each having a hair line in functional relationship with said first and second scale indicating means.

HUGO ARMANDO LEVRERO.

No references cited.